May 9, 1950 O. H. BANKER 2,507,137
AUTOMATIC TRANSMISSION APPARATUS AND CONTROLS
Original Filed April 24, 1940 4 Sheets-Sheet 1

Inventor
Oscar H. Banker
By Stone, Artman and Bisson
Att'ys.

May 9, 1950            O. H. BANKER            2,507,137
AUTOMATIC TRANSMISSION APPARATUS AND CONTROLS
Original Filed April 24, 1940            4 Sheets-Sheet 4

Patented May 9, 1950

2,507,137

UNITED STATES PATENT OFFICE 2,507,137

AUTOMATIC TRANSMISSION APPARATUS AND CONTROLS

Oscar H. Banker, Evanston, Ill., assignor to New Products Corporation, Chicago, Ill., a corporation of Delaware Original application April 24, 1940, Serial No. 331,309, now Patent No. 2,394,580, dated February 12, 1946. Divided and this application April 14, 1944, Serial No. 531,130

8 Claims. (Cl. 74—336.5)

This invention has to do with change-speed apparatus for transmitting power between a throttle-controlled engine and a load, and relates particularly to such a system employing a clutch, an automatic change-speed transmission and a fluid pressure system for controlling the operation of said clutch and said transmission according to the degree of advancement of the engine throttle and the speed of said engine. This application is a division of my copending application Serial No. 331,309, filed April 24, 1940, for Automatic transmission apparatus and controls, now issued into Patent No. 2,394,580.

A primary object of this invention is the provision of a change-speed apparatus or system satisfactorily employing a fluid motor or envelope type of clutch in the power connection between the engine and the load. Clutches comprising an inflatable envelope that carries parts frictionally engageable to transmit load, when the envelope is inflated, have been used heretofore in the transmission of power, their advantages being ease of control, uniformity of action in the application of driving force to the load and the absorption of tortional vibrations inherent to all reciprocating engines. However, the fluid envelope clutch has been regarded as useful only in marine or other installations where speed ratio changes between the engine and load are unnecessary, or occur infrequently and without a series of shifts in rapid succession through power trains of graduated ratio as is the practice in motor vehicles. This limitation in the use of the fluid envelope clutch has existed because the envelope carries one of the friction elements and would, therefore, be damaged by the heat generated in such element in prolonged severe slippage periods, when the clutch is of a size and load rating not adversely affecting its cost.

Some automotive installations employ a fluid flywheel or fluid turbine type of coupling for reducing tortional vibration. These fluid couplings, however, have the disadvantage of operating with an energy wasting "slip" between the driving and driven members at all speeds, of increasing the engine speed at all vehicular speeds and of causing annoying engine rush at low vehicular speeds. The present invention, as another of its objects, provides apparatus operable in a manner to obtain all of the advantages of the fluid coupling installation while avoiding said disadvantages, and this is done by combining a fluid envelope clutch with a transmission that changes speed ratio without concomitant release and reengagement of the clutch. Inasmuch as the present type of clutch transmits power through yieldable walls of an inflated envelope, the tortional vibrations of the engine are absorbed by said walls, and, since the clutch permits no slipping between its friction elements when fully engaged, the installation accomplishes the purpose of the fluid coupling without the increment of engine speed.

A further object of the present invention is the provision of a throttle-controlled valve between a fluid pressure source and the clutch, for meting fluid from the source to the clutch in an amount and at a pressure proportionate to the advancement of the engine throttle to cause the clutch to take up load slowly and uniformly as fuel is fed to the engine.

The invention further contemplates the combination of the aforesaid throttle-controlled inflatable power transmission clutch in combination with a multi-ratio power transmission of the character wherein changes in the power trains are effected by closing the engine throttle for causing the engine, and transmission parts driven thereby, to slow down to synchronism with cooperative driven parts of the transmission associated with a higher ratio power train and wherein means is provided for automatically connecting the synchronised parts upon their synchronization for establishing such high power train. In accomplishing this object, additional valve means is provided between the fluid pressure source and the clutch, and a speed-responsive device is placed in control of this additional valve means for causing the same to provide direct communication between said source and said clutch when the speed-responsive device registers engine and vehicular speeds in excess of a predetermined minimum, and to terminate the connection between the throttle-controlled valve and the clutch so that when the throttle is periodically closed during operation of the vehicle, the clutch will remain closed and fluid will not be wasted by periodic filling and exhausting thereof A further object of the invention is the provision of a new arrangement of transmission wherein the main shaft is bored axially to provide space for a tube comprising a part of the fluid pressure line between the fluid pressure source and the clutch, and projects outwardly through an end of the gear box to facilitate the attachment to said tube of a coupling member communicative with an outer portion of said line.

A further object of this invention is the provision of a transmission of the countershaft type wherein the power take-off is from the end of the countershaft adjacent to the clutch or bell housing and through a shaft directed substantially perpendicularly to the countershaft.

A still further object of the invention is the provision in a countershaft type transmission of an improved arrangement wherein the gears making up the low and reverse speed power trains are disposed upon central sections of said shafts and wherein the gears making up the higher ratio power trains are disposed adjacently to the ends of said shafts and their bearing supports.

Still a further object of the invention is the provision in combination with a multi-ratio power transmission wherein changes between the power trains are effected automatically, of means normally biased into a position for preventing establishment of the higher ratio power trains, and a fluid motor operable to move said means into an inactive position to permit the normal automatic establishment of said power trains, said motor being so operative when subjected to fluid pressure from said source under control of a valve which is operated by an engine-driven speed-responsive device when the latter registers speeds in excess of a predetermined minimum.

With the above objects in view, the preferred embodiment of the invention will now be described with reference to the annexed drawing, wherein.

Figure 1:
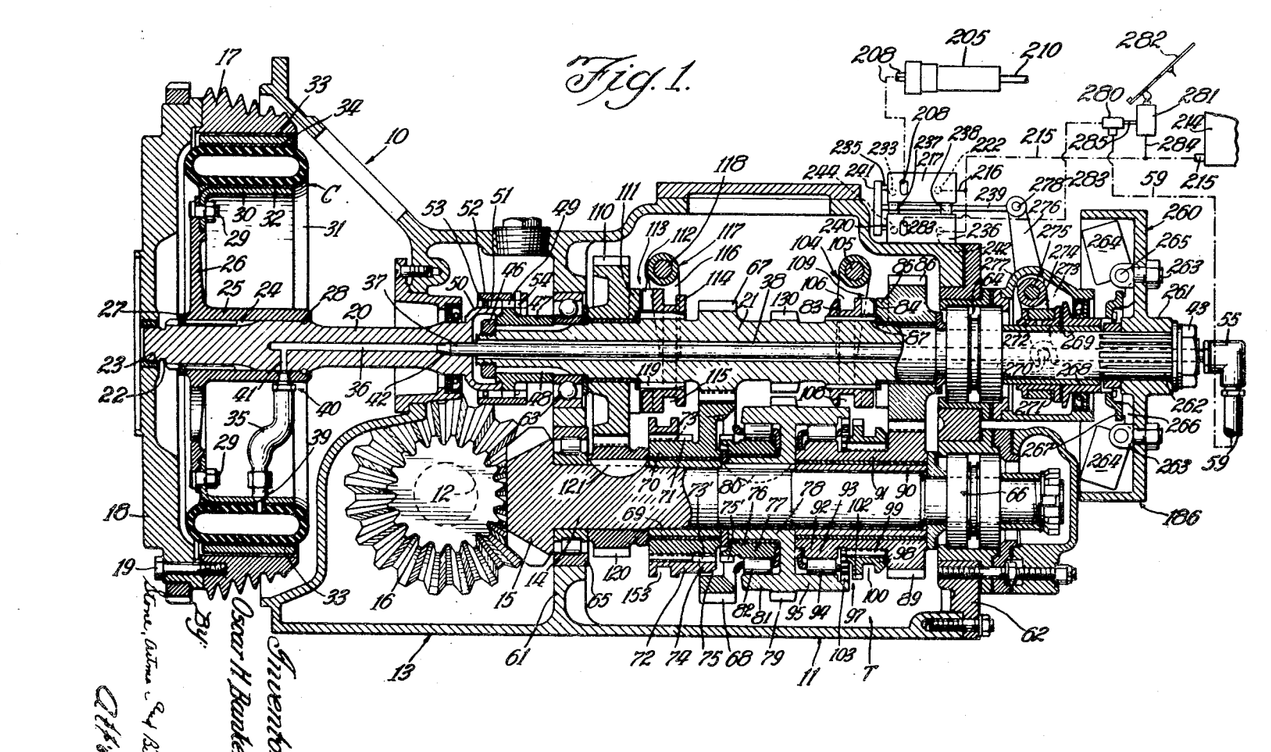
Fig. 1 is a plan view, principally in section of a preferred embodiment of the invention.

Referring now to the drawing, and particularly to Fig. 1 thereof, the apparatus will be seen to include a clutch generally designated C, within a clutch housing 10, a countershaft type of transmission unit generally designated T, within a gear box 11, and a power take-off or driven shaft 12 extending upwardly into a chamber 13. Said shaft 12 is driven from a countershaft 14 through bevel gears 15 and 16 respectively upon the shafts 14 and 12. This drive arrangement particularly adapts the apparatus for use in rear engine vehicles in which the engine is mounted above the rear axle and with its crankshaft in parallelism with the rear axle. The driven shaft 12 extends downwardly into driving relation with a rear axle differential (not shown), suitable universal joint means (not shown) being provided between said shaft and said differential.

An annular driving member 17 of the clutch C is secured to the engine flywheel 18 in any standard manner, as by means of bolts 19. An extension or forepart 20 of the transmission mainshaft 21 is disposed coaxially with the flywheel 18, and has its left end section 22 carried within the flywheel within a pilot bearing 23. Such shaft extension 20 is splined at 24 to facilitate the connection thereto of a hub 25 upon a driven member 26 of the clutch C. Snap rings 27 and 28 are employed for preventing axial movement of the clutch driven member 26 upon the shaft extension 20. Bolts 29 spaced circumferentially about the disk-like members 26 are used for securing an annular flange member 30 thereto. Said piece 30 in turn carries an annular inflatable envelope 31 which is suitably joined thereto by a vulcanized rubber film as indicated at 32. The envelope 31 comprises side walls of flexible fabric-reinforced rubber constructed similarly to the side walls of conventional pneumatic tire casings. A plurality of friction elements 33, in the form of axially extending bars for engagement with the clutch driving member 17, are secured to the outer periphery of the inflatable envelope 31 in any suitable manner as by means of a vulcanized rubber film 34.

When the envelope 31 is in its normal uninflated or relaxed condition its contour is such as to withdraw the bar-like friction elements 33 from engagement with the inner periphery of the clutch driving member 17, but when said envelope is inflated with fluid under pressure the elements 33 will be forced outwardly into frictional engagement with the member 17 whereby the clutch driven member will be caused to rotate with the driving member.

Pressure-fluid is admitted to and exhausted from the envelope 31 through a fluid pressure line comprising a tube 35, a bore 36 in the shaft extension 20, a tube 37 communicating with said bore 36 and extending lengthwise through the mainshaft 21 within a bore 38. A fitting 39 extends through the annular flange 30 and into communicative relation with the envelope 31 to connect the tube 35 with the envelope. A fitting 40 connects the other end of the tube 35 with a lateral passage 41 which communicates with the bore 36. The right-hand end of the bore 36, Fig. 1, is enlarged in the form of a frustro-conical flare 42 to adapt it for hermetically engaging a frustro-conical exterior end section of the tube 37. A nut 43 in threaded relation with a reduced end section 43a of the mainshaft 21 has a flange 44 drawn firmly against a shoulder 45 of the tube 37 for pressing the tapered left end section of said tube firmly into the flared section 42 of the bore 36. Axial separation of the shaft 21 and the extension 20 is prevented by a coupling assembly including a nut 46 threaded upon a reduced right end section of said shaft 21 and bearing against a coupling member 47 which is splined to the shaft 21 at 48. Said coupling member 47 is also splined on its outer side at 49 as is an enlarged end section 50 of the extension shaft 20 at 51. An internally splined ring 52 meshes with the splines 49 and 51 upon the parts 47 and 50, and snap rings 53 and 54 which are sprung outwardly into grooves cut circumferentially in the ring 52 transversely of the spline quills bear against the ends of the spline quills 51 and 49 to prevent axial separation of the parts 47 and 50.

Figures 3, 4, 9:
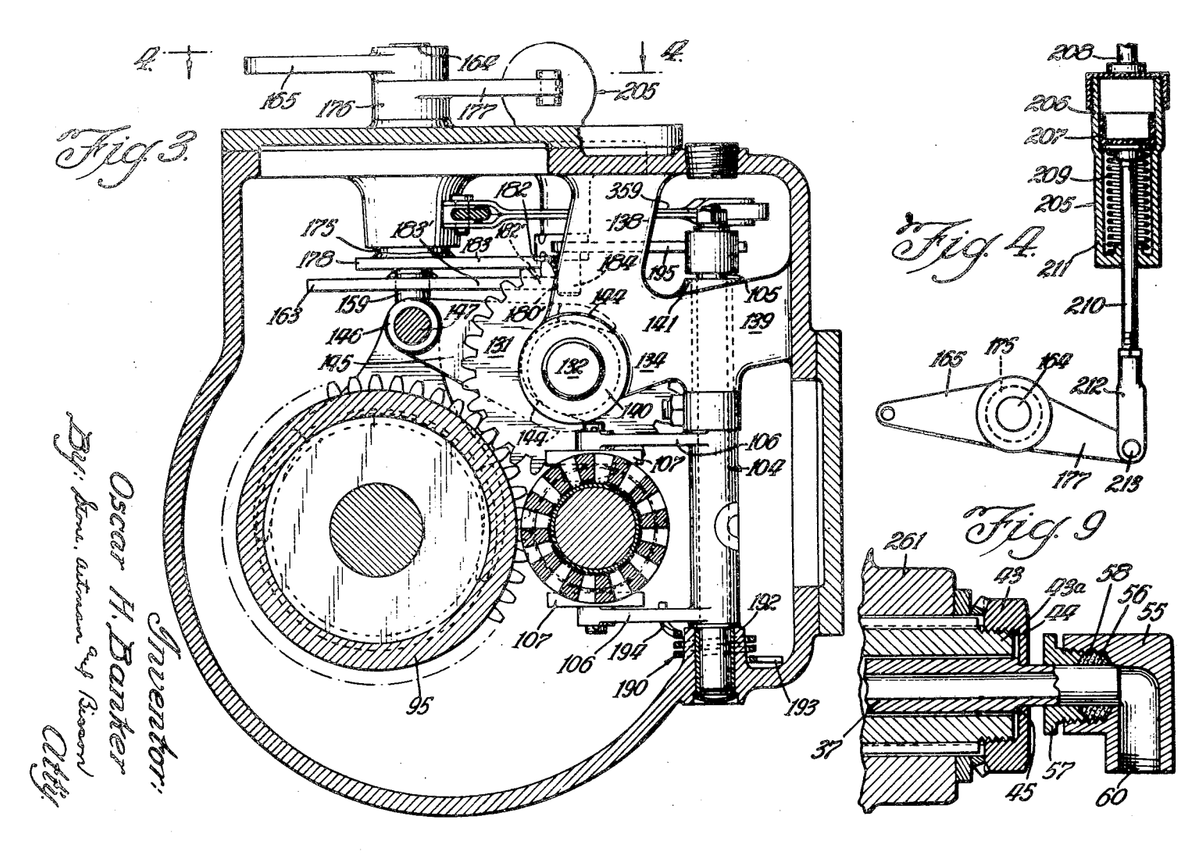
Fig. 3 is a transverse sectional view taken on the line 3—3 of Fig. 2.
Fig. 4 is a longitudinal sectional view taken through a motor unit which is instrumental in controlling establishment of the second and third speed power trains.
Fig. 9 is an enlarged fragmentary view showing details in the connection of the fluid pressure line at the right-hand end of the transmission main shaft in Fig. 1.

Pressure-fluid is introduced into the tube 37 through an L fitting 55 upon the right end of said tube, Fig. 1, and shown in detail in Fig. 9. The outlet end of the fitting 55 includes a packing gland 56 compressible by the turning of a nut 57 into an internally threaded section 58. The inlet end of said fitting 55 has a conduit 59 in threaded relation with an internally threaded section 60 thereof, this conduit 59 connecting with the pressure-fluid system in a manner presently described.

Opposite end walls 61 and 62 of the gear box have bearing units 63 and 64 respectively disposed therein in axial alignment for rotatively supporting the mainshaft 21. A second set of bearing units 65 and 66 within these end walls rotatively carry the countershaft 14.

The transmission is connectible through three forward speed power trains and one reverse power train. The first speed or lowest ratio power train receives power through the extension 20 of the mainshaft 21, and transmits such power through a gear 67 integral with the mainshaft, a gear 68 freely rotatable about a bearing sleeve 69 upon the countershaft 14, the hub 70 of said gear 69, splines 71 upon said hub, a clutch ring 72 slidable axially of said hub 70 and having internal splines 73 meshing with the splines 71. Said clutch ring has a plurality of circumferentially spaced axially projecting lugs 74 projecting into openings 75 respectively registered therewith in the gear 68, one of such lugs 74 and openings 75 being shown in the lower part of Fig. 1. Certain of the splines 73 upon the clutch ring 72 project onto the lugs to form clutch teeth 73', so that when the ring 72 is slid axially to the right, as viewed in Fig. 1, said teeth 73' are caused to mesh with clutch teeth 75' upon an end of a driving member 76 of an overrunning clutch 77. Said overrunning clutch driving member 76 is freely rotatable upon the hub 78 of a gear 79 which is attached non-rotatively to the countershaft 14 by a key 80. A driven element of the overrunning clutch 77 is provided by a cylindrical flange 81 which is capable of being driven by a plurality of clutch rollers 82 in one direction only as is well understood by those skilled in the art. Again picking up the drive for the first speed power train at the clutch ring 72, when this ring is slid to the right as viewed in Fig. 1 for meshing the clutch teeth 73' with the clutch teeth 75', rotative force is transmitted to the overrunning clutch driving member 76 which is effective through the clutch rollers 82, which are wedged thereby against the inner periphery of the flange 81, for rotating the gear 79 and the countershaft 14 to which said gear is non-rotatively attached. Power is transmitted outwardly of the apparatus through the bevel gears 15 and 16 and the transmission driven shaft 12.

The second speed power train includes a clutch ring 83 splined to the mainshaft 21 and movable axially to the right for meshing clutch teeth 84 thereon with mating clutch teeth 85 upon a gear 86 which is freely rotatable upon the shaft 21. Clutch teeth 84 and 85 have bevel end faces 87 and 88, as clearly shown in Fig. 2, so that when the clutch ring 83 is shifted to the right to press the faces 87 and 88 together while the ring 83 happens to be rotated at a greater speed than the gear 86 there will be a ratcheting action of the teeth 84 past the teeth 85 to prevent the meshing of these teeth in a manner involving no objectionable noise and incurring no injuries thereto. Similarly constructed and cooperable teeth as the clutch teeth 84 and 85 are shown and fully described in my United States Patent No. 2,140,502. The second speed power train also includes a gear 89 freely rotatable about a bearing sleeve 90 upon the countershaft 14 and in constant mesh with the gear 86. An integral sleeve 91 of the gear 89 has upon the left end thereof a driving member 92 of a second speed overrunning clutch 93. This overrunning clutch is similar to the overrunning clutch 77, the driving member 92 being effective through clutch rollers 94 for imparting rotation to a driven member 95 comprised by an annular flange upon the gear 79. Establishment or mobilization of the second speed power train is accomplished by a shifter fork 104 fixed upon an operating shaft 105 therefor and having legs 106 disposed upon opposite radial sides of the ring 83 where said legs pivotly carry shoes 107 disposed within a groove 108 of the ring. Counter-clockwise pivotal movement of the shaft 105 imparts to the shoes 107 a force to cause the ring 83 to be shifted to the right for meshing the clutch teeth 84 and 85 of the second speed clutch 109. During certain periods of operation of the apparatus, when the teeth 84 and 85 of the second speed jaw clutch 96 are meshed for mobilizing the second speed power train, power will be transmitted from the mainshaft 21 through said clutch 96, the gears 86 and 89, sleeve 91, overrunning clutch 93, flange 95 and gear 79 to the countershaft 14 and thence outwardly of the apparatus through the gears 15 and 16 and the driven shaft 12.

During periods of operation when it is desired to hold the vehicle under close supervision, as when traveling over a rough uneven surface as those often encountered in detours, it will be desired to use the braking effect of the vehicle engine, and to accomplish this the second speed power train will be made into a two-way drive train by shunting out the overrunning clutch 93. This is done by means of a jaw clutch 97 comprising a sildable ring member 98 internally splined at 99 to the sleeve 91. Said ring member 98 has a groove 100 for a shifter fork 101, Fig. 2, and a set of jaw teeth 102 meshable with a set of jaw teeth 103 upon the gear flange 95 when the ring 98 is shifted to left as viewed in Fig. 1. When the clutch teeth 102 and 103 are thus meshed, the driving and driven parts of the overrunning clutch 93 are connected together for effecting a two-way drive independently of the clutch rollers 94.

The third speed power train comprises a gear 110 freely rotatable upon the mainshaft 21 excepting when clutched thereto by the teeth 111 and 112 of a jaw clutch 113. Said teeth 111 of the jaw clutch 113 are integral with the gear 110 whereas the teeth 112 project axially to the left from a clutch ring 114, which also has a groove 115 in which are disposed shoes 115' (one of which is shown in dotted outline in Fig. 2) upon the ends of legs 116 of a shifter fork 117 carried non-rotatively upon a shaft 118. When the shaft 118 is rotated clockwise the shifter fork 117 and shoes thereon disposed within the groove 115 of clutch ring 114 will bear against the left side of this groove for urging the clutch teeth 112 into mesh with the clutch teeth 111. The clutch ring 114 is splined to the mainshaft 21 as indicated at 119. Also included in the third speed power train is a gear 120 secured non-rotatively to the countershaft 14 by a key member 121, the gears 110 and 120 being constantly meshed.

Figure 2:
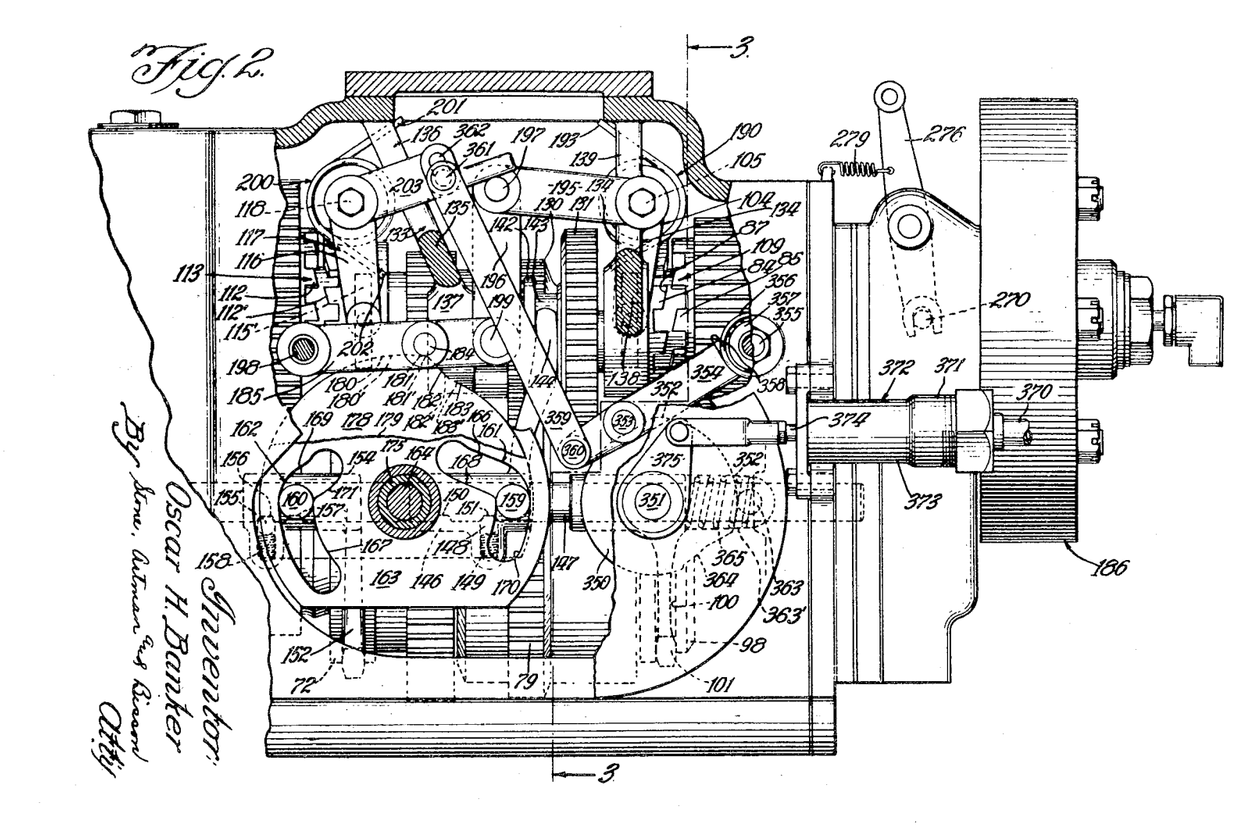
Fig. 2 is a fragmentary plan view of the transmission gear box with a portion of the upper side wall of said box broken away to expose the cams and linkages for controlling the transmission power trains.

A reverse power train includes a mainshaft gear 130 and the countershaft gear 79. The reverse power train is established when an idler gear above the gears 130 and 79 is slid mutually into mesh with them. This idler gear is shown at 131 in Figs. 2 and 3. Referring mutually to Figs. 2 and 3, the reverse idler gear 131 will be seen to be carried rotatively upon a countershaft 132 of which the ends are supported in gear box brackets 133 and 134 of which both are shown in part in Fig. 2 and of which only the bracket 134 is shown in Fig. 3. The bracket 133 has a vertical leg 135 depending from the upper side wall of the gear box and a leg 136 projecting inwardly from a vertical side wall of the gear box. A junction section 137 of these legs 135 and 136 carries one end of the countershaft 132. A leg 138 of the bracket 134 depends from the upper wall of the gear box, whereas a horizontal leg 139 projects inwardly from a vertical side wall of the gear box, and a junction section 140 of these legs carries the other end of said shaft 132. It will also be noted in Fig. 3 that the bracket leg 139 provides a bearing section 141 for one end of the shifter fork operating shaft 105. The idler gear 131 has a shifter ring 142 attached to its left end, Fig. 2, there being a groove 143 in said ring for receiving the bifurcations 144 of a shifter fork 145. Both bifurcations 144 of the shifter fork 145 are shown in Fig. 3 in dotted outline; one of such bifurcations is shown in Fig. 2.

A sleeve-like base section 146 of the reverse shifter fork 145 is slidably mounted upon a shifter fork rod 147 anchored in opposite ends of the gear box. A detent ball 148, shown in dotted outline in Fig. 2, is carried in the sleeve 146 where it is constantly urged by a spring 149 against the rod 147. This rod has a pair of notches 150 and 151 in either of which the detent 148 is adapted to be seated by the spring 149 when in registry therewith. When the shifter fork 145 occupies the position shown in Fig. 2 with the detent 148 seated in the recess 151, the reverse idler gear 131 is disposed in a position to the right of and out of mesh with the reverse train gears 130 and 79, thereby demobilizing the reverse speed power train. Shifting of the fork 145 to the left upon the rod 147, as viewed in Fig. 2, is resisted by the detent 148 as it is cammed outwardly of the notch 151 against the urge of the spring 149, but when the fork 145 is shifted sufficiently far to the left to carry the idler gear 131 mutually into mesh with the gears 130 and 79 for establishing the reverse power train, the detent 148 will have reached a position of registry with the notch 150 to seat therein and thus yieldably resist demeshing of the gears.

As is explained hereinabove with reference to Fig. 1, mobilization of the lowest or first speed power train is accomplished by sliding a clutch ring 72 to the right for carrying the clutch teeth 73' thereon into mesh with the clutch teeth 75' on the driving member 76 of the first speed overrunning clutch 77. Shifting of the clutch ring 72 is accomplished by means of a shifter fork 152, Fig. 2, of which the bifurcations project into a groove 153 in said ring. This shifter fork 152 has a sleeve-like base section 154 slidably mounted upon the shifter fork rod 147 and a detent device comprising a ball 155 shown in dotted outline in Fig. 2 within said base section 154 for cooperating with a pair of notches 156 and 157 in the rod 147 in a manner similar to that described with respect to the ball 148. A spring 158, shown in dotted outline, constantly urges the ball 155 against the rod 147. When the shifter fork 152 is in the position shown in Fig. 2, the clutch ring 72 will be held to the left demeshing the clutch teeth 73' and 75', as illustrated in Fig. 1. The detent device comprising the ball 155 yieldably resists movement of the shifter fork 152 and of the clutch ring 72 from this position, but when said fork is shifted to the right while camming the ball 155 out of the notch 156, the clutch ring 72 will be moved to the right and will completely mesh the clutch teeth 73' and 75' at the time the ball 155 is moved into seating relation with the notch 157. At this time the first speed power train will be mobilized.

Shifting of the forks 145 and 152 of the reverse power train and of the first speed power train is accomplished by means of cylindrical studs 159 and 160 projecting respectively from the sleeve-like base portions 146 and 154 of these shifter forks into cooperative relation with cam slots 161 and 162 in a cam plate 163, Figs. 2 and 3. This cam is manually controlled. It is fixed to the lower end section of a control shaft 164, which, as shown in Fig. 3, has a control arm 165 non-rotatatively secured to its upper end. A linkage (not shown) extends from the end of the control arm 165 into a position conveniently accessible to the driver of the vehicle.

The cam plate 163, in selectively mobilizing either the first speed power train or reverse power train is rotated between oscillative limits. The plate 163 is illustrated in Fig. 2 in a neutral position wherein neither of these power trains is mobilized. Mobilization of the reverse power train is effected by rotating the cam plate 163 clockwise whereby the stud 159 is cammed to the left by an edge 166 of the slot 161 to move the shifter fork 145 and the idler gear 131 to the left to carry said gear mutually into mesh with the reverse power train gears 130 and 79. At the end of this operative movement of the cam plate 163 the detent ball 148 will be seated in the notch 150. Meanwhile, the arcuate slot section 167, concentric with the axis of the shaft 164, will have simply received the stud 160 without having shifted it axially of the rod 147.

When it is later desired to demobilize the reverse power train the cam plate 163 will be rotated in the opposite direction, and during this rotation the edge 168 of the slot 161 will be operative for camming the stud 159 to the right into the position shown while the arcuate notch section 167 will again idly traverse the stud 160. When it is desired to mobilize the first speed power train the cam plate 163 will be rotated counter-clockwise to close the edge 169 of the slot 162 to shift the stud 160 to the right by a camming action thereon, and to thus shift the fork 152 to the right for engaging the clutch teeth 73' and 75', Fig. 1. Meanwhile, the detent ball 155 will have shifted into registry with the notch 157, and the arcuate portion 170 of the slot 161 will have simply moved idly with respect to the stud 159 without shifting it. Demobilization of the first speed power train is accomplished by rotating the cam plate 163 clockwise from the just described position while the edge 171 of the slot 162 is effective for camming the stud 160 to the left into the position shown in Fig. 2 and to thus demesh the clutch teeth 73' and 75' of the first speed jaw clutch.

A sleeve 176, Figs. 2 and 3, is rotatively mounted upon the control shaft 164. This sleeve projects upwardly through the upper wall of the gear box where it carries the hub 176 of an operating arm 177. The inner and lower end of the sleeve 175 non-rotatively carries a cam plate 178 above and in parallelism with the cam plate 163 as is best illustrated in Fig. 3. Only an edge portion of the cam plate 178 is shown in Fig. 2, this cam plate being broken away at the line 179 to expose the slots 161 and 162 in the cam plate 163. The cam plate 178 is controlled by a governor 186 to prevent automatic engagement of the second and third speed clutches 109 and 113, Figs. 1 and 2, while the vehicle is at rest or is proceeding at speeds below a predetermined minimum. This it accomplishes by means of edge profile section 180 ending at a point 181 and cam sections 182 and 183 which, through a roller 184 upon an arm 185, control the pivoted position of such arm about a pin 198 anchored in the upper wall of the gear box. Just how the arm 185 constrains engagement of the clutches 109 and 113 will be explained presently, but first it will be explained that the cam 163 is also operable upon the roller 184 for controlling the pivotal position of the arm 185 by means of edge profile sections identical to and directly beneath the cam profile sections 180, 182 and 183 and designated by the reference characters 180', 182' and 183'. These latter named cam profile sections are also indicated in Fig. 3 where the relation of the cam plates 163 and 178 with respect to the roller 184 are shown.

As previously explained, the cam plate 163 is manually controlled for determining whether the vehicle shall be driven forwardly or backwardly, or whether the transmission mechanism shall be arranged in a neutral position so the vehicle will be driven neither forwardly nor backwardly. When the plate 163 is in the neutral position, as shown in Fig. 2, or in the reverse position, the cam point 181' or the adjacent long radius profile section 180' of said cam plate will be in registry with the roller 184 for maintaining the arm 185 in the position shown and thereby prevent engagement of either of the overrunning jaw clutches 109 and 113, as will be explained.

Referring now to Figs. 2 and 3, a coil spring 190 will be seen wrapped about the lower bearing member 192 for the control shaft 105 which carries the second speed shifter fork 104. One end, 193, of this spring reacts against a wall of the gear box, whereas the other end, 194, is hooked about the lower leg of said shifter fork 104 to constantly urge said fork to pivot in a direction for shifting the clutch teeth 84 toward the clutch teeth 85.

Also secured to the shaft 105, at its upper end, is an arm 195 pivotally connected to a link 196 by a pin 197 at its end. The opposite end of the link 195 is connected with the right end of the arm 185, Fig. 2, by a pivot pin 199. It will be seen that any tendency for the shifter fork 104 to be rotated counter-clockwise, Fig. 2, by the spring 190 will tend to cause the left end of the arm 195, as well as the link 196 and the right end of the arm 185, to move toward the cam plates 178 and 163, and when either of the cam points 181 or 181' is in registry with the roller 184 this movement cannot take place. However, if both of the cam plates 178 and 163 were to be rotated counter-clockwise to bring their short radius profile sections 183 and 183' into registry with the roller 182 there would be no impediment to such movement of the arms 195 and 185 and the link 196, wherefore the action of the spring 190 would result in pivotal movement of the fork 104 for shifting the clutch teeth 84 into engagement with the clutch teeth 85 and into mesh therewith when these sets of teeth are synchronized.

A spring 200, Fig. 2, similar to the spring 190, has an end section 201 which reacts against a side wall of the gear box and an opposite end 202 hooked about the lower leg 116 of the shifter fork 117, thereby constantly urging clockwise pivotal movement of said shifter fork 117. When, however, either of the cam points 181 or 181' is in registry with the roller 184, such clockwise rotation of the shifter fork 117 and the shaft 118 upon which it is mounted will be prevented by an arm 203 which is non-rotatively secured to the upper end of said shaft and of which arm a free end section bears against an upwardly projecting portion of the link pin 197.

The governor-controlled apparatus for determining the pivoted position of the cam plate 178 includes a fluid controlled unit or motor 205 secured to the upper wall of the gear box as illustrated in Fig. 3. This motor is shown in detail in Fig. 4 where it will be seen to comprise a cylinder 206 in which there is a piston 207 which is normally held in the position shown by pressure-fluid introduced into the cylinder through a conduit 208. The pressure of said fluid will be such as to overcome the force of a spring 209 which surrounds an operating rod 210 extending through a spring chamber 211 into connection with said piston. An adjustable clevis 212 interconnects the rod 210 and the arm 177 by means of a pivot pin 213. Hence it will be seen that when pressure-fluid is present in the cylinder 206 the arm 177, the sleeve 175, Figs. 2, 3 and 4, and the cam plate 178 will be pivoted to the limit of their clockwise movement for disposing the cam point 181 against the roller 184. When the pressure-fluid in the cylinder 206 is released, the spring 209 will be effective for expelling the fluid from the cylinder while rotating the arm 177 and the cam plate 178 counter-clockwise to bring the short radius cam profile section 183 into registry with the roller 184 whereby the cam 178 will permit engagement of the overrunning jaw clutches 109 and 113 of the second and third speed power trains.

The motor unit 205 is shown schematically in Fig. 1 where it will be seen that fluid pressure therefor is received from a pressure tank or reservoir 214 through a conduit 215, a branch conduit 216, a valve 217 and the conduit 208. The valve 217, shown in detail in Fig. 7, normally provides communication between the reservoir 214 and the motor 205. When, however, this valve is actuated under control of the governor 186, it will be conditioned for terminating the communication between the reservoir and said motor and for opening an exhaust port 233 through which the pressure-fluid within the cylinder 206 is discharged pursuant to the spring 209 forcing the piston 207 to the opposite limit of its reciprocal movement.

A second valve 236, instrumental in the control of the clutch C as will be explained presently, is secured to a side wall of the gear box. Connecting members 237 and 238 are employed for securing the valves 217 and 236 together in spaced apart relation so as to accommodate a valve actuating link 239 between said valves. The valve 236, shown in detail in Fig. 6, is controlled by a reciprocal valve stem 253 provided with a cap 240 whereas the valve 217 is controlled by a reciprocal valve stem 234 having a cap 235, and axial movement of these valve stems is effected by a cross-piece 241 upon the link 239 when the latter is moved to the right.

Figures 5, 6, 7, 8:
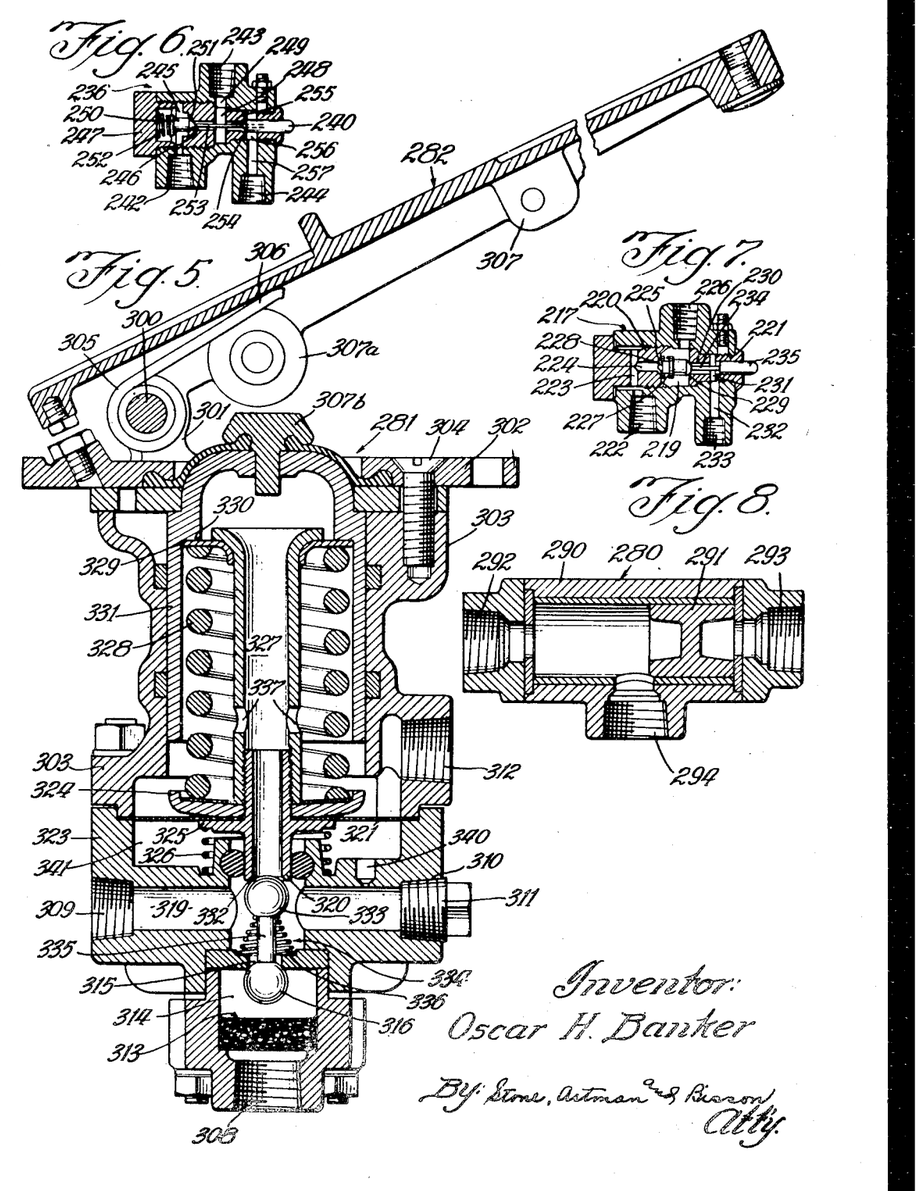
Fig. 5 is an enlarged sectional view taken axially through the throttle-controlled valve and a foot accelerator pedal associated therewith.
Fig. 6 is a sectional view taken through a governor-controlled valve for admitting pressure-fluid to the main clutch of the transmission apparatus.
Fig. 7 is a sectional view taken through a governor-controlled valve which controls the admission of pressure-fluid to the fluid motor unit shown in Figs. 1, 3 and 4.
Fig. 8 is a sectional view taken through a switching valve which also appears in Fig. 1.

An examination of the construction details of the valve 217, in Fig. 7, shows it to have a central chamber 219 closed at opposite ends by plugs 220 and 221 which are screwed into place. Pressure-fluid is fed into the valve 217 through the conduit 216, Fig. 1, which has a threaded end section connected with the valve inlet port 222. Fluid introduced to the valve at the port 222 feeds inwardly through a channel 223 in the plug 220, an axial channel 224 intersecting the channel 223, past a valve seat 225 into the valve chamber 219, and thence out through an outlet port 26 with which the conduit 208 is connected as illustrated in Fig. 1. A spring 227 normally holds a valve head 228 away from the seat 225 for maintaining the just traced passages of the valve open and for holding the opposite end of the valve head against a seat 229 about the entrance of an exhaust passage which comprises an axial channel 230 in the plug 221, a transverse channel 231 in said plug, a channel 232 in the valve chamber casing, and an exhaust port 233. The valve stem 234 connects the valve head 228 with the cap 235. It will be seen that when an external force is applied to the cap 235, the stem 234 and the valve head 228 will be moved to the left, Fig. 7, against the yieldable force of the spring 227 for closing the above traced feed line between the inlet port 222 and the outlet port 226, while unseating the valve head from the seat 229 and thereby connecting the outlet port 226 with the exhaust port 233 through the chamber 219 and the channels 230, 231 and 232.

The valve 236 has an inlet port 242, an outlet port 243 and an exhaust port 244. While in the valve 217, the inlet and outlet ports 222 and 226 are normally in communication through the valve, the converse is true with respect to the valve 236. A potential passage for the flow of fluid between the inlet port 242 and the outlet port 243 is through channels 245 and 246 of a valve chamber plug 247, a valve chamber 248 and a channel 249. This passage, however, is normally closed by a valve head 250 which is normally pressed against a valve seat 251 by a spring 252. Meanwhile, the cap 240, which comprises a valve head upon the opposite end of a valve stem 253, is maintained unseated from a seat 253 in the exhaust line which includes an axial channel 255, a transverse channel 256 and a chamber wall channel 257 leading to the exhaust port 244. When the valve cap 240 is pressed to the left, as viewed in Fig. 6, it will press against the seat 254 to terminate communication between the outlet port 243 and the exhaust port 244 while unseating the valve head 250 from the seat 251 and thus providing communication between the inlet port 242 and said outlet port 243.

The governor or speed-responsive apparatus for controlling the movement of the link 239 includes a cylindrical housing 260 of which a hub 261 is splined to a section 262 of the transmission mainshaft 21. Fulcrum members in the form of studs 263 for inertia weights 264 are anchored to the web of said housing 260, pivot pins 265 being carried by said studs for the pivotal support of said inertia weights. Heel portions 266 upon the weights 264, when these weights are pivoted about the pins 265 by centrifugal action, bear against a collar 267 for shifting the same to the left together with a sleeve 268 and a collar 269 with which it is associated, there being trunnions 270 projecting from diametrically opposite sides of the collar and of which one is shown in dotted outline in each of Figs. 1 and 2. A felt ring or the like 271 which is saturated with a lubricant is carried by the collar 269. When the sleeve 268 and the collar 269 are moved to the left, upon a sleeve 272, the trunnions 270 which engage the ends of legs 273 of a fork 274, cause this fork and the shaft 275 upon which it is fixedly mounted to rotate clockwise, thereby causing clockwise rotation of an arm 276, which is attached to the lower end of the shaft 275 exteriorly of the casing 277, against the force of a spring 279 which constantly urges the weights 264 inwardly in opposition to their centrifugal force. Thus the link 239 which is pivotally connected to the arm 276 by pin 278 is moved to the right for actuating the valves 217 and 236 as above described.

Detent means (not shown) of any conventional structure is employed in association with the inertia weights 264 to prevent their movement from the low speed position in which they are shown until a selected minimum critical speed is attained by the shaft 21, at which time they will quickly pivot clockwise to a higher speed position. Similar detent means (not shown) is provided in association with these weights for retaining them in the clockwise position until the speed of said shaft 21 is reduced to a predetermined minimum. In this manner the weights 264 are caused to move quickly between the extremities of their oscillative movement.

It will be recalled that the valve 217, when actuated by the speed-responsive device 186, is conditioned for terminating the communication of the reservoir 214 with the cylinder 206 of the fluid motor 205, and for connecting said cylinder with the exhaust port 233 of said valve so the pressure in said cylinder will be relieved and the spring 209 will become effective for shifting the link 210 in the direction to cause counter-clockwise rotation of the cam plate 178, Fig. 2, to place the short radius profile section 183 thereof in registry with the roller 184, thereby leaving the second and third speed power trains untrammelled for automatic mobilization so far as this part of the control apparatus is concerned. The valve 236, however, in cooperation with a switching valve 280 (shown schematically in Fig. 1 and in detail in Fig. 8) and a throttle-responsive valve 281 (shown schematically in Fig. 1 and in detail in Fig. 5) serves to control inflation of the clutch envelope 31 and hence the degree of resistance to relative rotation between the driving and driven parts of the main clutch C. An interlock between the engine throttle and the throttle-responsive valve 281 is provided by an accelerator pedal 282 which is shown in association with said valve 281 in both Figs. 1 and 5.

Before describing these additional valves in detail, their relation to each other and their general environment in the pressure-fluid control system will be made clear. In the operation of the valves 236, 280 and 281, pressure-fluid, impressed from the reservoir 214 through conduits 215 and 284 upon the valve 281 is metered through such valve into a conduit 285 and thence through valve 280, conduit 59, the fitting 55, tube 37 in the transmission mainshaft 21, pasages 36 and 41, tube 35 and into the envelope 31 for creating a pressure in the envelope of a magnitude corresponding to the degree of throttle opening, or, the degree to which the accelerator pedal 282 is depressed. Hence in starting the vehicle from rest, pressure-fluid from the reservoir 214 will be introduced into the envelope 31 for inflating the same and increasing the amount of power transmitted through the clutch C in accordance with the amount of fuel fed to the engine. When the engine, the vehicle and the transmission mainshaft 21 reach a predetermined minimum speed, the speed-responsive device 186 will shift the link 239 to the right in Fig. 1 for manipulating the valve 236 whereby the pressure-fluid carried to the intake port 242 of this valve through the conduit 215 will be passed through the valve and outwardly of its outlet port 243 through the conduit 283 and through the valve 280 (which will be actuated by the predominant pressure of the fluid introduced through the conduit 283 for connecting the conduit 283 with the conduit 59 and disconnecting the conduit 285 from said conduit 59), the conduit 59 and the above traced fluid line to the envelope 31 for imposing the full pressure of fluid from the reservoir 214 upon the clutch C to maintain the same completely engaged. This action of the valves 236, 280 and 281 will be fully understood after the valves 280 and 281 have been described in detail.

In Fig. 8 the switching valve 280 will be seen to comprise a cylinder 290 having one inlet port 292 connected with the conduit 283 and a second inlet port 293 connected with the conduit 285. An outlet port 294 of this valve is connected with the conduit 59. It will be understood that when pressure-fluid is introduced into either of the inlet ports 292 or 293 the force of that fluid will cause a piston 291 to shift to the opposite end of the cylinder 290 and thus provide communication between the inlet port at which the pressure-fluid is introduced and the outlet port 294. If pressure-fluid is supplied to both of the inlet ports 292 and 293 the piston 291 will be forced to the end of the cylinder at which the fluid pressure is least, thereby connecting the port having fluid at the greatest pressure with the outlet port 294 and disconnecting the inlet port of least pressure from the outlet port.

The accelerator-operated valve 281, Fig. 5, is associated with the foot accelerator pedal 282 which is pivotally connected at its lower end with a pivot rod 300 which is mounted in a bracket 301 upon a plate 302 secured to the upper end of the casing 303 of said valve by a plurality of screws as 304. A spring 305 which is wrapped about the rod 300 has an end section 306 which bears against the under side of the pedal 282 with a force sufficient to normally hold the pedal in its uppermost position, as shown in Fig. 5. A linkage (not shown) for operably connecting the pedal 282 with the vehicle throttle valve is connectible with said pedal at an apertured lug 307. Said pedal carries a roller 307a for actuating the valve 281 by pressing downwardly upon a button 307b of the valve when the pedal is depressed in the conventional manner for opening the vehicle throttle.

Pressure-fluid is admitted into the valve through the conduit 284, Fig. 1, which is connected with the inlet port 308 and an outlet port for the pressure-fluid is provided at 309 where the conduit 285 is attached. A second outlet port 310, not used in the present installation, is closed by a screw plug 311. An exhaust port 312 is also provided in the side wall of the valve casing.

Fluid introduced into the inlet port 308 and through a filter member 313 in an entrance cavity 314 is withheld from further ingress into the device through a passage 315 by a valve ball 316 so long as the accelerator pedal 282 is in its upper or released position as shown, but when said pedal is pressed downwardly by the foot of the operator to open the engine throttle, the ball 316 will be moved downwardly, as presently explained, from the end of the passage 315 for a sufficient length of time to admit fluid upwardly through said passage and outwardly of the port 309 until a back pressure is built up in the channel 319 corresponding to the amount of throttle opening. When the accelerator pedal 282 is released, communication is established between the outlet port 309 and the exhaust port 312 through the passage 319 and an exhaust tube 320.

The valve 281 is divided into upper and lower sections by a flexible metal diaphragm 321 which is hermetically sealed about its circular edge between casing parts 303 and 323. The diaphragm 321 receives the tube 320 in a central opening and a spring seat 324 and a flange 325 upon the exhaust tube 320 hermetically clamp the central section of the diaphragm 321 therebetween. A spring 326 bearing against the lower edge of the flange 325 constantly urges the diaphragm 321 upwardly as well as the spring seat 324 and a tubular spring guide 327 which is threaded onto the tube 320. A pressure graduating spring 328 surrounds the tubular guide 327 and is held selectively compressed between the seat 324 and a seat member 329 at the upper end of said spring, said seat member 329 bearing against a shoulder 330 within a hollow piston member 331 which is vertically reciprocal in the cylindrical casing 303.

While the pedal 282 is in the released position as shown, the spring 326 will be effective for maintaining the diaphragm 321 in the upward position illustrated as well as the graduating spring assembly comprising the graduating spring 328, the spring guide 327 and the exhaust tube 320. Upon depressing the accelerator pedal the roller 307a will be caused to bear against the button 307b to force the piston 331 and the said graduating spring assembly downwardly. Pursuant to this downward movement of the graduated spring assembly a seat 332 at the lower end of the exhaust tube 320 will be pressed against an exhaust ball 333 of an intake and exhaust assembly 334 which includes said ball 333, the ball 316 connected therewith by a rod 335 and a spring member 336. This pressing of the seat 332 against the ball 333 closes the exhaust passage so there will be no communication between the channel 319, and the exhaust port 312 through an exhaust line which includes openings 337 in the spring guide tube 327, and the interior of the casing 303. Meanwhile the pressure of fluid within the chamber 314 is acting upon the ball 316 for holding it in closing relation with the passage 315. Additional downward movement of the accelerator pedal 282 will, however, through the spring 328, force the diaphragm 321, the tube 320 and the intake and exhaust assembly 324 downwardly for unseating the ball 316 from the passage 315. Resistance to this downward movement is encountered because of force of the pressure-fluid upon the ball 316 wherefore the graduating spring 328 will be slightly compressed incident to the flange or collar 329 sliding downwardly along the spring guide 327. The fluid thus admitted through the passage 315 and the channel 319, and hence into the envelope 31 of the clutch C, will also pass through one or more openings 340 into the chamber 341 below the diaphragm 321 and thus augment the force of the spring 326 in urging the diaphragm upwardly at its center. Eventually the pressure of fluid in the channel 319 and in the chamber 341 will reach a magnitude sufficient for lifting the diaphragm 321 against the force of the graduating spring 328 and when this happens the spring 336 will cause the balls 333 and 316 to follow the tube 320 upwardly, whereby the exhaust passage remains closed at the seat 332 to maintain the pressure in the channel 319. When the ball 316 reaches closing relation with the lower end of passage 315 no more fluid will be admitted to the channel 319, and so long as the accelerator pedal 282 remains undisturbed, the pressure in the channel 319 will remain fixed.

Upon further depressing the accelerator pedal the piston 331 and the upper end of the graduating spring 328 will be shifted downwardly incident to further compressing the spring 328 while moving its lower end and the center of the diaphragm 321 downwardly to cause downward movement of the tube 320 and the valve balls 333 and 316. Thus additional pressure-fluid is admitted through the passage 315 into the channel 319, and when enough fluid has been admitted into said channel and through the opening 340 into the chamber 341, the diaphragm 321 will again be lifted at its center while still further compressing the graduating spring 328. When the graduating spring is compressed enough to have permitted upward movement of the tube 320 and the balls 333 and 316 sufficiently for the ball 316 to have again closed the passage 315, the pressure in the passage 319 will remain fixed at the higher value so long as the pedal 282 remains unmoved.

Upon any further depression of the accelerator pedal and the consequent increment in the compression of the graduating spring 328, a corresponding increase in pressure will be incurred in the channel 319 by fluid admitted through the passage 315, for when the depression of the accelerator pedal is stopped at any given point, the fluid admitted from the cavity 314 through the passage 315 and the hole 340 will quickly lift the diaphragm 321 sufficiently to permit the spring 336 to close the passage 315 with the ball 316 and thus strike a balance where the pressure in the channel 319 corresponds to the degree of advancement of said accelerator pedal.

Upon partial release of the accelerator pedal after a pressure has been built up in the channel 319, the tension in the graduating spring 328 will be partially relieved by a slight upward movement of its upper end with the piston 331 and the collar 329 relatively to the guide 327, and as a consequence of this, the pressure in the channel 319 and in the chamber 341 will be effective for moving the diaphragm 321 upwardly to unseat the lower end of the tube 320 from the exhaust ball 333, thus permitting escape of pressure-fluid through the tube 320, apertures 337, the interior of the valve casing 303 and the exhaust port 312. When the pressure in the channel 319 decreases sufficiently the compressed graduating spring 328 will be effective for forcing its lower end and the diaphragm 321 downwardly far enough to cause reengagement of the seat 332 with the exhaust ball 333. The pressure within the channel 319 may be further decreased by an amount determined by an additional partial release of the foot accelerator pedal for further diminishing the tension in the graduating spring 328, there being a repetition of the action of the pressure within the chamber 341 first lifting the diaphragm 321 to unseat the exhaust seat 332 and the compressed spring 328 thereafter being effective for forcing the diaphragm 321 downwardly as the pressure in the chamber 341 decreases with the escape of pressure-fluid into the exhaust passage, until finally a balance is reached concurrently with the seat 332 reaching the exhaust ball 333.

It will be seen from the foregoing description that the valve 281 is effective for maintaining a pressure in the channel 319 proportional to the degree of depression of the accelerator pedal 282.

Operation of the apparatus:

In starting a vehicle, upon which the present apparatus is installed, from rest, a manual control (not shown) will be manipulated by the operator for rotating the arm 165, Fig. 3, and the shaft 164 upon which it is mounted for rotating the cam plate 163, Figs. 2 and 3, either clockwise or counter-clockwise from the neutral position shown in Fig. 2. If it is desired to move forwardly the cam plate 163 will be rotated counter-clockwise whereby the stud 160 will be cammed to the right by the edge 169 of the slot 162. In this manner the shifter fork 152 and the clutch ring 72, Figs. 1 and 2, will be moved to the right for meshing the clutch teeth 73' and 75', thus mobilizing the first speed power train. This having been done the operator will accelerate the vehicle engine by depressing the accelerator pedal 282 and concurrently the roller 307a upon said pedal will be brought into engagement with the button 307b of the valve 281 and the valve actuated in the manner hereinabove described for admitting pressure-fluid from the reservoir 214 and the conduit 284 into the channel 319 of said valve and hence through the conduit 285 into the right end of the switching valve 280, Figs. 1 and 8. At this time the transmission mainshaft 21 will be at rest wherefore the speed-responsive device 186 will be in its inactive position as shown in Fig. 1 and the valve 236 will be conditioned for stopping the flow of pressure-fluid thereinto through the conduit 215 and for connecting the conduit 283 and hence the left end of the switching valve 280 with the exhaust port 244 of said valve 236. Since the left end of the switching valve 280 is then connected with an exhaust, the pressure-fluid introduced into the right end of this valve member will throw the piston 291 to the left for cutting off communication between the conduit 283 and either of the conduits 285 or 59 and for establishing communication between the conduits 285 and 59. Since the conduit 59 constitutes a section of the line through which pressure-fluid is carried for admittance into the clutch envelope 31, the pressure in this line and in the envelope 31 will reach amounts depending upon the amount of advancement of the pedal 282. The valve 281 will be so regulated that the degree of inflation of the envelope 31 will be such, with respect to the advancement of the accelerator pedal, that the clutch will transmit power from the engine to the transmission mainshaft 21 in a sufficient amount to prevent engine rush but to provide for adequate engine speed for developing sufficient power for driving the mainshaft and the vehicle load with which it is connected. As the pedal 282 is advanced and the vehicle engine throttle opened the clutch C will thus uniformly engage the driven friction elements 33 with the clutch driving member 17, the power being transmitted through the shaft extension 20 and the mainshaft 21, gears 67 and 68, clutch teeth 73' and 75', the overrunning clutch 77, gear 79, countershaft 14, bevel gears 15 and 16 and outwardly of the device through a driven shaft 12 to the vehicle running gear.

After the clutch C is fully engaged so there is no slippage between the friction elements upon its driving and driven parts and after the vehicle and the vehicle engine have attained a predetermined minimum speed, the speed-responsive device 186 will become effective in the manner hereinabove described for shifting the link 239, Fig. 1, to the right for actuating the valves 217 and 236 by pressing their valve stem caps 235 and 240 inwardly thereof.

Upon this manipulation of the valve 236 the conduit 283 will be disconnected from communication with the valve exhaust port 244 and will be connected with the reservoir 214 through the inlet port 242 of said valve and the conduit 215. In this manner the full force of the pressure-fluid in the reservoir 214 is impressed upon the left end of the piston 291 in the switching valve 280 to force this piston to the right end of the valve upon release of the accelerator pedal 282 and the concomitant adjustment of the throttle-controlled valve 281 for connecting the conduit 285 and the right end of the valve 280 with the exhaust port 312 of said valve 281. Subsequent depression and release of the pedal 281 during operation of the vehicle will be ineffective for shifting the piston 291 to the left since the pressure in the conduit 285 will never exceed that in the reservoir 214 which reservoir pressure is supplied in the left end of the valve. Therefore, after the transmission mainshaft 21 attains the speed at which the inertia weights 264 are thrown outwardly, the valves 236 and 280 will function for directing pressure-fluid into the conduit 59 independently of the throttle-responsive valve 281 and to maintain the clutch C fully engaged irrespective of the position of the accelerator pedal.

It will be noted, however, that each time the accelerator pedal is depressed, fluid from the reservoir 214 will be admitted into the valve channel 319 and into the conduit 285, the amount of fluid and the pressure thereof depending on the amount of the advancement of the pedal, and that upon release of the accelerator pedal the seat 332 at the bottom of the exhaust tube 320 will be lifted from the exhaust ball 333 to result in the exhausting of fluid from the conduit 285 and the channel 319. Consequently, in order to conserve pressure-fluid, which in the present installation is compressed air that is exhausted to the atmosphere through the exhaust passage 312, the switching valve 280 will be placed closely to the throttle-responsive valve 281 to shorten the conduit 285 and minimize the volumetric capacity of this conduit.

It will be understood from the above detailed description of the valve 217 that upon attainment of said predetermined speed of the mainshaft 21 and the actuation of the speed-responsive device 186 for pressing the stem of said valve inwardly, said valve will be conditioned for terminating the communication between the inlet port 222 and the conduit 208 whereby pressure-fluid is no longer available through the conduits 215, 216, said valve 217 and the conduit 208 for maintaining the piston of the fluid motor 205 at the extremity of reciprocal movement illustrated in Fig. 4. Said valve 217 is further conditioned for connecting the conduit 208 with the exhaust port 233 of said valve whereby the spring in the motor 205 becomes operable to force the piston to the opposite extremity of its reciprocal movement while expelling the fluid outwardly through the conduit 208 and the exhaust port 233. This movement of the piston pulls the rod 210 with it to cause counter-clockwise rotation of the arm 177, Fig. 4, and of the sleeve 175, Fig. 2, with which said arm is connected. Thus the cam plate 178, Fig. 2, which is connected with the sleeve 175 is rotated counter-clockwise to carry the short radius profile 183 thereof into registry with the roller 184. When thus positioned, the cam plate 178 will permit the arm 185 carrying the roller 184 to pivot clockwise about its pivot-pin 198 and thus permit the link 196 and the adjacent ends of the arms 195 and 203 to move toward the cam plate 178 in the direction they are urged by the springs 190 and 200. This action occurs upon said counter-clockwise rotation of the cam plate 178 since the cam plate 163 was previously rotated counter-clockwise, while mobilizing the first speed power train, to carry its short radius profile 183' into registry with the roller 184. The springs 190 and 200, in addition to rotating the arms 195 and 203 also rotate the shifter forks 134 and 117 respectively counter-clockwise and clockwise as viewed in Fig. 2 to carry the teeth 84 of the second speed jaw clutch 109 against the teeh 85 of that clutch and to similarly carry the teeth 112 of the third speed jaw clutch 113 into engagement with the teeth 111 thereof.

At this time, while the apparatus is operating in the first speed power train, the transmission mainshaft 21 will be rotating at greater speed than the second and third speed gears 86 or 110 and consequently the teeth of the clutches 109 and 113 will not mesh. The faces 87 of the teeth 84 will simply ratchet over the teeth 85 and likewise the faces 112' of the teeth 112 will simply ratchet over the ends of the teeth 111. While the vehicle is thus proceeding forwardly with the first speed power train in operation and at any time following the critical minimum speed at which the speed-responsive device 186 operates for indirectly causing counter-clockwise rotation of the cam plate 178, the operator may change over into the second speed power train by releasing the accelerator pedal to permit the vehicle engine and the transmission mainshaft 21 to decelerate sufficiently to cause the clutch teeth 84 of the second speed jaw clutch 109 to synchronize with the teeth 85, of said clutch whereupon the spring 190 will be effective for causing the teeth 84 to slide into mesh with said teeth 85. Meanwhile, the gear 86 which carries the clutch teeth 85, due to the momentum of the vehicle running gear with which it is connected through the countershaft 14, will have maintained substantially a constant speed of rotation. This connection with the countershaft is impositive in character, it being due to the frictional drag of the overrunning clutch 93, of the bearing 90, of a thrust ring R carried on said countershaft and frictionally engaging the back end of the gear 89. Likewise, the gear 79, which is splined to the countershaft 14, will have maintained substantially a constant rate of rotation, but that part of the first speed power train including the gears 67, 68, the clutch teeth 73' and 75', and the driving member 76 of the first speed overrunning clutch 77 will have decelerated with the vehicle engine as permitted by the clutch rollers 82. When the second speed jaw clutch 109 is engaged the second speed power train will be established and will enable the engine to pick up the load upon depression of the accelerator pedal 282. The gear 79 will continue to overrun the driving member 76 of the first speed overrunning clutch 77 when its flange 95 is connected in series with the gears 86 and 89 and the overrunning clutch 93 as part of the second speed power train.

When it is desired to change over into the third speed power train the operator will again release the accelerator pedal 282 for closing the engine throttle and decelerating the engine together with the transmission mainshaft 21 and the third speed jaw clutch teeth 112 which rotate with said shaft 21. Concurrently the momentum of the vehicle will keep the countershaft 14 and the gear 79 keyed thereto rotating at substantially constant speed as permitted by the overrunning clutch rollers 82 and 94, and when the clutch teeth 112 slow down to synchronism with the clutch teeth 111, which had been rotating at slower speed than the clutch teeth 112 because of the connection with the countershaft 14 through the gears 120 and 110, the spring 200 will be effective for sliding said teeth 112 into mesh with the teeth 111 for establishing the third speed power train. Subsequent depression of the accelerator pedal 282 will cause power from the engine to be transmitted through the third speed power train comprising the jaw clutch 113 and the gears 110 and 120. Meanwhile, the driven parts of the overrunning clutches 77 and 93 respectively of the first and second speed power trains and carried upon the gear 79 will be rotating at a speed in excess of the driving members 76 and 92 of these clutches as permitted by the clutch rollers 82 and 94.

If at any time the operator should care to change over from the third speed power train to the second speed power train as he may want to do in order to obtain greater accelerating power for passing another vehicle upon the highway, he may accomplish this act by causing counter-clockwise rotation of a cam 350, Fig. 2, which is rotatively supported upon a stud 351 in the upper wall of the gear box. This rotation of the cam 350 will carry a long radius profile section 352 thereof against a roller 353 upon an arm 354 which is pivoted upon a pin 355 in the upper side wall of the gear box. A spring 356 wound about the hub 357 of the arm 354 has an end section 358 bent into the form of a hook and constantly bearing against said arm for pressing the roller 353 against the profile of the cam 350. When the cam section 352 is brought against the roller 353 the arm 354 will be pivoted clockwise for causing endwise movement of a link 359 which has an end connected with the free end of the arm 354 by a pin 360 and which has at its opposite end a pin 361 projecting into an elongated slot 362 in the arm 203. While the apparatus is connected in the third speed power train the arm 203 will be rotated clockwise with the shifter fork 117 so that the counter-clockwise end of the slot 362, with respect to the axis in the shifter fork shaft 118, will be in receiving relation with the pin 361 so that when the link 359 is moved endwise as stated above, the pin 361 will bear against said counter-clockwise end of the slot 362 for pivoting the arm 203 and hence shifter fork 117 counter-clockwise into the position shown for disengaging the third speed jaw clutch 113. With the third speed power train thus demobilized, the vehicle engine will speed up for picking up the load through the second speed power train which includes the overrunning clutch 93.

Said counter-clockwise rotation of the cam 350 for disengaging the third speed jaw clutch 113 also carried said profile section 352 from registry with a roller 363, Fig. 2, which is mounted upon a base extension section 363' of the shifter fork 101, and carried a short radius profile section 364 into registry with such roller to permit sliding movement of said shifter fork to the left upon the shifter fork rod 147 under the influence of a compressed spring 365 which is disposed about said rod 147 with its opposite ends respectively bearing against the right end wall of the gear box and the base of said shifter fork. Therefore, when the engine is speeded up sufficiently for picking up the load through the second speed power train incident to bringing the driving member 92 of the second speed overrunning clutch 93 up to the speed of the flange 95 upon the gear 79, the clutch teeth 102 and 103 of the lockout clutch 97 will be brought into synchronism so the movement of the shifter fork 101 to the left in the manner described by the force exerted by the spring 365 will result in the meshing of the clutch teeth 102 with the teeth 103 to lock out the overrunning clutch 93 and thus convert the second speed power train into a two-way-drive power train.

Rotation of the cam 350 is effected by the operator manipulating valve means (not shown), which may be similar to the valve 236 in Fig. 1, for establishing communication of a conduit 370, Fig. 2, with a fluid pressure source to force a piston (not shown) in a cylinder section 371 of a fluid motor 372 to the left incident to compressing a spring (not shown) in a spring chamber 373 of said motor and moving a rod 374 connected with said piston to the left. Said piston rod 374 is operably connected with said cam through an arm 375 which is also rotatable upon the stud 351.

When it is again desired to establish the third speed power train, the operator will relieve the fluid pressure extended through the conduit 370 to the fluid motor 372 whereby said spring (not shown) within the spring chamber 373 will retract said piston (not shown), the piston rod 374 and the arm 375 to cause clockwise rotation of the cam 350 into the position shown. The roller 363 is thus cammed radially outwardly onto the long radius section 352 for disengaging the clutch 97 and for carrying the short radius section of said cam into registry with the roller 353 to enable the spring 200 to again rotate the shifter fork 117 for pressing the clutch teeth 112 against the clutch teeth 111. By thereafter decelerating the vehicle engine as hereinabove described the clutch teeth 112 may be slowed down to synchronism with the clutch teeth 111 and permitted to mesh therewith.

When the reverse power train is established as above described by rotating the cam plate 163 clockwise as viewed in Fig. 2 for shifting the reverse idler gear 131 mutually into mesh with the gears 130 and 79, the vehicle will be started rearwardly by simply pressing upon the accelerator pedal 282 for feeding fuel to the engine and opening the valve 281 for admitting pressure-fluid from the reservoir 214 through the switching valve 280 and the pressure line including the conduit 59 to the clutch envelope 31. As before, the inflation of the envelope and the pressure between the friction elements upon the driving and driven members of the clutch will be controlled in accordance with the depression of the accelerator pedal.

In bringing the vehicle to a stop the operator need use only his brake, for after the speed-responsive device slows down sufficiently the weights 264 will permit the spring 279 to pivot the arm 276 for moving the link 239 to the left and permitting outward movement of the valve stems of the valves 217 and 236. Valve 217 will then re-connect the motor 205 with the pressure-fluid source so this motor will rotate the cam 178 for placing its long radius profile section 181 in registry with the roller 184 whereby the arms 185, 195, and 203 are rotated to disengage the third and second speed jaw clutches 113 and 109. The first speed power train remains mobilized but when the stem of valve 236 moves outwardly the direct connection through this valve of the reservoir 214 with the clutch envelope 31 is terminated so that the engagement of clutch C will depend upon whether the accelerator pedal is depressed. Consequently the mobilized first speed power train is disconnected from the engine when the operator releases the accelerator pedal as the brakes are applied for stopping.

The performance of the clutch C is analogous to that of a fluid flywheel insofar as it automatically provides uniformly diminishing slippage for a smooth initial engagement and absorbs tortional vibrations originating in the engine. It has the additional advantage, however, of dispensing with the continual slippage that occurs in the fluid flywheel type of clutch.

This improved clutch installation is made practical by virtue of the combination therewith of the pressure-fluid control system therefor interlocked for operation in accordance with the amount of throttle opening and engine and vehicular speed, and also by virtue of the automatic change-speed apparatus which effects changes in speed ratio without incurring disengagement and reengagement of said clutch.

Since all power trains in the present transmission include paired gears respectively upon the mainshaft and the countershaft, the layout has been designed to minimize vibration by arranging the gears of the higher ratio trains, which are used for greater time periods and for transmitting the most power, adjacently to the bearings which support these shafts in opposite end walls of the gear box.

Attention is also particularly directed to the control feature of the transmission that provides for conditioning the lock-out jaw clutch for the second speed overrunning clutch whereby said overrunning clutch is automatically shunted out to convert the second speed power train into a two-way-drive train when the manually supervised shift is made to this train from the third speed power train. This method of control simplifies the shifting operation and thus avoids any likelihood of the operator becoming confused when shifting from third to second speed to employ the braking force of the engine while descending a steep grade.

I claim:

1. In a system wherein a power transmission mechanism is employed for transmitting power between driving and driven shafts, and wherein said transmission mechanism comprises a plurality of power trains of graduated speed attaining capabilities successively and automatically establishable in driving relation between said shafts, the combination of cam means having separately operable parts associated with and disposable in an active position relatively to a higher speed one of said trains to preclude its establishment between said shafts and retractable into an inactive position with respect to said higher speed train to leave it free for automatic establishment, a clutch engageable to condition a lower speed train of said trains for operation, means manually settable to concurrently engage said clutch and to retract one of said cam parts from its active position, means yieldingly urging the other of said cam parts into the inactive position, and a fluid motor connected with said other cam part and energizable only when subjected to a differential of pressure-fluid to dispose the same in the active position.

2. In a system wherein a power transmission mechanism is employed for transmitting power between driving and driven shafts, and wherein said transmission mechanism comprises a plurality of power trains of graduated speed transmitting capabilities successively and automatically establishable in driving relation between said shafts, the combination of cam means associated with and disposable in an active position relatively to a higher speed train of said power trains to preclude its establishment between said shafts and retractable into an inactive position with respect to said higher speed power train to leave it free for automatic establishment, a fluid pressure responsive unit operably connected with said cam means, said unit being operable for placing said cam means either in the active position or in the inactive position according to whether a section of said unit is subjected to atmospheric pressure or to a pressure differing from atmospheric pressure, a source of fluid at pressure differing from atmospheric pressure, and means responsive to the speed of one of said shafts and operable to alternatively subject said unit to the pressure of said fluid source or to atmospheric pressure according to whether speeds above or below a predetermined speed are recorded.

3. In a transmission having a plurality of power trains of graduated speed transmitting capabilities for establishing a one-way driving connection between driving and driven members and having means for automatically establishing a next higher speed train in response to a drop in driving member speed, means for initially establishing a low speed train, control means for positively maintaining the means for automatically establishing the higher speed trains inactive at selected low speeds of the driven member, and means responsive to a selected speed of one of said members when the latter is accelerating for nullifying the action of said control means so it no longer maintains the higher speed establishing means inactive.

4. In a transmission having a plurality of power trains of graduated speed transmitting capabilities for establishing a one-way driving connection between driving and driven members and having means for automatically establishing a next higher speed train in response to a drop in driving member speed, manually functioned means for initially establishing a low speed train, fluid pressure means for positively maintaining the means for automatically establishing the higher speed trains inactive at selected low speeds of the driven member and means responsive to a selected speed of one of said members when the latter is accelerating for rendering the fluid pressure means inoperable, whereby the means for automatically establishing the higher speed ratios in the transmission is conditioned for functioning.

5. In a transmission having a low-speed train and at least one higher speed train for establishing a driving connection between driving and driven members and having means for automatically establishing the higher speed train in response to a drop in driving member speed, a clutch normally urged to establish a connection through the higher speed train between the driving and driven members, means terminating in a cam follower for controlling the engagement or disengagement of said clutch, a pair of aligned cams each having a profile of which both are engaged by said follower and each profile having a first portion for registering with the follower so as to permit closing of the clutch and a second portion registerable with the follower so as to open the clutch, manual means for operating one cam to place its first profile portion in registry with the follower while concurrently connecting the driving and driven members through the low speed ratio, and means responsive to a selected speed of one of said members when the latter is accelerating for operating the second cam so as to place its first profile portion in registry with the follower and thereby to condition the transmission for establishing the higher speed train.

6. In a transmission having a low-speed train and at least one higher speed train for establishing a driving connection between driving and driven members and having means for automatically establishing the higher speed train in response to a drop in driving member speed, a clutch in the higher speed train of the type wherein the two clutching members may be urged into engagement without damaging them, and yet without engaging them until the two parts reach a common speed, means for urging the two parts of the clutch into engagement, means terminating in a cam follower for controlling the engagement or disengagement of said clutch, a pair of aligned cams having respective profiles both cooperable with said follower and each profile having a first portion registerable with the follower to avoid interference with closing of the clutch and a second portion registerable with the follower to move the same into position for holding the clutch open, manual means for operating one of said cams to place its first profile portion in registry with the follower so that it will permit closing the clutch while concurrently connecting the driving and driven members through the low-speed train, and means responsive to a selected speed of one of said members when the latter is accelerating for operating the second cam to carry its first profile portion into registry with said follower so as to permit closing of the clutch and thereby condition the transmission for establishing higher speed train.

7. In a transmission having a low-speed train and at least two higher speed trains for establishing driving connections between driving and driven members and having means for automatically individually establishing said higher speed trains in response to a drop in driving member speed, a clutch in each of the higher speed trains normally urged to establish a connection therethrough between the driving and driven members, linkage means terminating in a cam follower for controlling the engagement or disengagement of both of said clutches, a pair of aligned cams having profiles of which both are cooperable with said follower and each profile having a first portion registerable with the follower so as to avoid interference with closing of the clutches and a second portion registerable with the follower to hold the same for opening said clutches, manual means for operating one of said cams to place its first profile portion in registry with the follower to permit closing both clutches while concurrently connecting the driving and driven members through the low speed ratio, and means responsive to a selected increased speed of one of said members for operating the other cam to place its first profile portion in registry with the follower to permit closing of both of said clutches and thereby to condition the transmission for establishing the higher speed trains pursuant to the functioning of the means for automatically establishing said trains.

8. In a transmission having a low speed train and at least two higher speed trains for establishing a one-way driving connection between driving and driven members and having means for automatically individually establishing the higher speed trains in response to a drop in driving member speed, means for initially establishing a low speed train, means for positively maintaining the means for automatically establishing the higher speed trains inactive at selected low speeds of one of said members and responsive to a higher speed of said one member for rendering operative the means for automatically establishing the higher speed trains, and manual means operable at will for establishing a lower speed train while the automatic means has the transmission connected through a higher speed train.

OSCAR H. BANKER.

REFERENCES CITED

The following references are of record in the file of this patent:

UNITED STATES PATENTS

| Number | Name | Date |
|---|---|---|
| 1,985,884 | Banker | Jan. 1, 1935 |
| 2,120,104 | Livermore | June 7, 1938 |
| 2,140,502 | Banker | Dec. 20, 1938 |
| 2,177,904 | Maybach | Oct. 31, 1939 |
| 2,203,296 | Fleischel | June 4, 1940 |
| 2,262,747 | Banker | Nov. 18, 1941 |